United States Patent
Tyler

[15] 3,697,694

[45] Oct. 10, 1972

[54] TELEPHONE SYSTEM INCLUDING ATMOSPHERIC PRESSURE TELEMETERING MEANS

[72] Inventor: Norvel P. Tyler, 714 Roland Drive, Norfolk, Va. 23509

[22] Filed: Oct. 5, 1971

[21] Appl. No.: 186,703

Related U.S. Application Data

[63] Continuation-in-part of Ser. No. 61,871, Aug. 7, 1970, abandoned.

[52] U.S. Cl. ....................179/2 R

[51] Int. Cl. ....................H04m 11/00

[58] Field of Search......179/2 R, 121 C, 121 R, 175.1 A, 179/175.2 C, 122; 340/200, 209, 182

[56] References Cited

UNITED STATES PATENTS

| | | | |
|---|---|---|---|
| 2,191,992 | 2/1940 | McLarn | 179/122 |
| 2,015,169 | 9/1935 | Vermeulen | 179/122 |
| 3,187,337 | 6/1965 | Otterlei | 340/182 |
| 3,061,823 | 10/1962 | Crossley | 340/200 |

*Primary Examiner*—William C. Cooper
*Assistant Examiner*—David L. Stewart
*Attorney*—J. Maxwell Carson, Jr.

[57] ABSTRACT

A telephone system including certain telephones equipped with a handset transmitter component responsive to barometric pressure variations in the ambient atmosphere to proportionately vary the electrical resistance of the carbon pile interconnected with the diaphragm thereof. These telephones are grouped at predetermined positions throughout the area covered by the telephone system. Conventional equipment is utilized at the central exchange of the telephone system to determine as simultaneously as possible the atmospheric pressure established basic electrical resistance of one of these certain telephones currently in use located at or near each of such predetermined positions, from which the atmospheric pressure at each of such predetermined positions may be established, to provide data useable by meteorologists.

4 Claims, 6 Drawing Figures

INVENTOR.
NORVEL P. TYLER

BY J. Maxwell Carson, Jr.
ATTORNEY

TELEPHONE SYSTEM INCLUDING ATMOSPHERIC PRESSURE TELEMETERING MEANS

This application is a continuation-in-part of my allowed copending application, Ser. No. 61,871, filed Aug. 7, 1970, now abandoned.

This invention relates generally to a system for determining at a central point the barometric pressure at each of a plurality of substantially regularly spaced points within a wide area to provide data from which accurate and current isobars covering such an area may be drawn, and more particularly to a handset transmitter component adapted to be installed in each of certain selected telephones in a telephone system covering a given area responsive to barometric pressure variations in the ambient atmosphere to proportionately vary the electrical resistance of the circuit associated with each of such telephones; such circuit resistance variations being determinable at the central exchange for such a telephone system.

Meteorologists have for many years considered maps of wide territorial extent upon which are accurately and very currently depicted high atmospheric pressure systems or areas and low atmospheric pressure systems or areas to be one of their most powerful tools. Such maps are best constructed by obtaining as nearly as simultaneously as possible barometric pressure readings from as many as possible fairly regularly spaced points within the area covered thereby and then as rapidly as possible using this data to draw isobars covering the territory shown therein; each isobar being a line drawn across the map connecting the points shown thereon where the atmospheric pressure, measured in millibars, is the same. Such isobars are generally depicted at four-millibar intervals. Much of the data presently assembled for this purpose is provided by persons who visually observe the atmospheric pressure indicated by barometers located at various points, and who then forward this information to a central point by conventional telephone communications, teletype transmissions, or the like; and other data presently assembled for this purpose originating in uninhabited regions, or sparsely inhabited regions without modern communications systems, may be supplied by unattended devices located at selected points spaced throughout such regions including, for example, a battery powered radio transmitter operable to broadcast signals indicative of the ambient atmospheric pressure such as the device disclosed in B. K. Hawes' U.S. Pat. No. 2,816,279 granted on Dec. 10, 1957. While the present invention obviously would not be adapted to either quantatively or qualitatively improve such data originating in uninhabited regions or those without modern communications systems, it is considered that such data originating in areas provided with telephone systems may be assembled faster and much more extensively when use is made of the instant invention than by the methods hereinbefore outlined involving the participation of a human observer stationed at each point of origin of such data.

Accordingly, an object of the present invention is the provision, in a telephone system, of a plurality of preselected and spaced telephones each including a transmitter component adapted to vary the electrical resistance of the circuit associated therewith in a manner determinable at the central exchange of the telephone system proportionately to the pressure variations in the ambient atmosphere.

Another object of the instant invention is the provision, in a telephone system, of means installed in certain, preselected telephones included in the system for transmitting to the central exchange of the system a readily interpretable electrical signal indicative of the barometric pressure of the ambient atmosphere and which in no way interferes with the normal use of such telephones.

According to the present invention, the foregoing and other objects are obtained by providing, in a telephone system, certain telephones equipped with a transmitter component responsive to pressure variations in the ambient atmosphere to proportionately vary the electrical resistance of the carbon pile interconnected with the diaphragm element thereof. These certain telephones, which are grouped at fairly regularly spaced intervals throughout the area covered by the telephone system in as close proximity as possible to each of the points of intersection of a regular system of grid lines constructed to extend over the area, are each provided with a handset transmitter component having an annularly corrugated transmitter diaphragm peripherally hermitically sealed to the handset transmitter casing with the outer surface thereof effectively exposed to the ambient atmosphere. The transmitter diaphragm changes shape in response to changes in atmospheric pressure to correspondingly induce a proportionate variation in what may be referred to as the basic electrical resistance of the carbon pile of the transmitter component; the carbon pile resistance variations produced by the sound waves generated as a person speaks into the transmitter being superposeable on the atmospheric pressure established basic electrical resistance thereof analogously to the system used in AM radio transmissions wherein audio frequencies are impressed on a carrier frequency. At the central exchange for the telephone system, conventional equipment is utilized to determine which of the certain telephones provided with a transmitter component according to the present invention grouped at or near the point where an atmospheric pressure reading is desired are in use, and conventional electrical measuring means are then used to determine the atmospheric pressure established basic electrical resistance of the circuit including one of the telephones in use at or near such a point.

A more complete appreciation of the invention and many of the attendant advantages thereof will be readily apparent as the same becomes better understood by reference to the following detailed description when considered in connection with the accompanying drawing wherein.

Figures 1, 2, 3, 4, 5, 6:
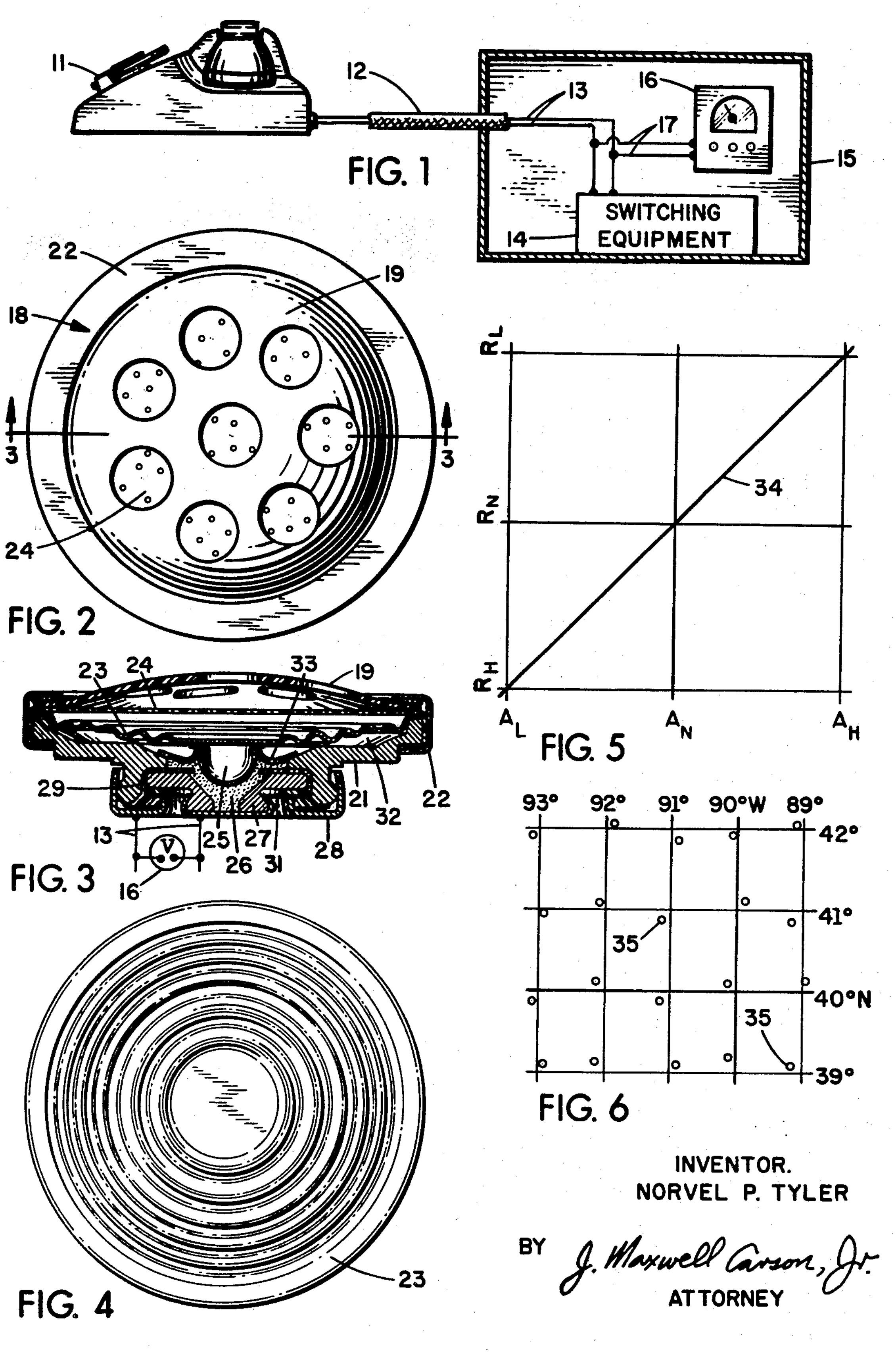
FIG. 1 is a schematic elevational view of the system according to the present invention.
FIG. 2 is a plan view of the telephone handset transmitter component according to the instant invention.
FIG. 3 is a sectional, elevational view of the telephone handset transmitter component, taken along the line 3–3 of FIG. 2.
FIG. 4 is a plan view of the diaphragm element of the telephone handset transmitter component.

FIG. 5 is a graphical representation of the correlation of atmospheric pressure and the electrical resistance of the circuit including a telephone provided with the transmitter component according to the present invention; and FIG. 6 is a representation of a system of grid lines covering an area and showing the positioning of a telephone provided with a handset transmitter component according to the present invention in the proximity of each point of intersection of the grid lines.

Referring now more particularly to the drawing, wherein like reference numerals designate the same or identical parts throughout the several views, and more specifically to FIG. 1, there is shown a telephone 11 interconnected by means of the cable 12 including the two electrical leads 13 with conventional switching equipment 14 located at the central exchange building 15 for the telephone system incorporating the telephone 11. Within the central exchange building 15, a conventional voltmeter 16 interconnected by means of the electrical leads 17 with the leads 13 of cable 12 may be conventionally utilized for determining the electrical resistance of the circuit including the telephone 11. As more explicitly set forth hereinafter, the electrical resistance of the circuit including the telephone 11 may be utilized to indicate the atmospheric pressure at the location thereof.

Turning now to FIGS. 2–4 of the drawing, there is shown a handset transmitter component utilized in the telephone 11, generally designated by the reference numeral 18, which when installed does not change in any way the external appearance thereof or interfere in any respect with the normal functioning thereof. More explicitly, the transmitter component 18 includes a conventional mouthpiece element 19 having air passages formed therethrough and interconnected with a first conventional metallic case element 21 by means of the circular channel member 22 having a web section positioned adjacent the circular peripheries of the mouthpiece element 19 and the case element 21 and further having a pair of flange sections, one of which peripherally extends over the outer surface of mouthpiece element 19 and the other of which peripherally extends over an annular outer surface of case element 21. Transmitter component 18 further includes an annularly corrugated metallic diaphragm 23 having an annularly substantially planar circular edge portion interposed between the peripheral portions of mouthpiece element 19 and case element 21 positioned between the flange sections of the channel member 22. Also, a thin and flexible circular sheet 24 of a normally air impervious material such as a suitable plastic is tautly positioned between the mouthpiece element 19 and the diaphragm 23; the sheet 24 being provided with a plurality of air passage apertures formed therethrough, as indicated in FIG. 2. The circular edge portion of sheet 24 further extends between the web section of the channel member 22 and the adjacent circular periphery of the case element 21 and thence between the annular outer surface of case element 21 and the adjacent flange section of channel member 22. The outer edge of the circular periphery of diaphragm 23 may be chamfered, as indicated in FIG. 4, to obviate the risk of the same cutting the sheet 24. The circular channel member 22 very tightly peripherally interconnects the mouthpiece element 19, the case element 21, the diaphragm 23, and the flexible sheet of material 24; the diaphragm 23 thereby being peripherally sealed in airtight fashion to the case element 21.

The telephone handset transmitter component 18 further includes a dome-shaped element 25 centrally connected to the inner surface of diaphragm 23 and extending inwardly into contact with a carbon pile 26 composed of a mass of somewhat compressible carbon granules also provided within the transmitter component 18 in a conventional manner. The carbon pile 26 is in electrical contact with the case element 21, and further is in electrical contact with a second conventional metallic case element 27 provided within the transmitter component 18. A circular metallic channel member 28 is utilized in a conventional manner to interconnect the first case element 21 and the second case element 27 of transmitter component 18; the first case element 21 and the second case element 27 being electrically isolated each from the other except through the carbon pile 26 by means of the insulator members 29 and 31 formed of a suitable dielectric material such as natural rubber or neoprene.

One of the electrical leads 13 interconnecting the telephone 11 and switching equipment 14 is connected to the metallic channel member 28 and the other of these electrical leads 13 is electrically interconnected with the case element 27. Current may flow through one of these leads 13 into, for instance, channel member 28 and thence into the case element 21 which is in metallic contact with the channel member 28. Current then may flow from the case element 21 through the carbon pile 26 and into the case element 27 and on into the other of the leads 13 which is electrically interconnected therewith. The resistance of the carbon pile 26 to a flow of electrical current therethrough, of course, is directly variable in accordance with the degree to which the granules thereof are compressed by the action of the dome-shaped element 25 connected to the diaphragm 23, and the resistance of the circuit including telephone 11 and the electrical leads 13 is proportional to the resistance of the carbon pile 26.

A space 32 extending between the inner surface of the diaphragm 23 and the case element 21, and also extending between the inner surface of the diaphragm 23 and an annular flexible element 33 interconnected between case element 21 and dome-shaped element 25 to overlie the granules of carbon pile 26 and maintaining the positioning thereof, is sealed off from the ambient atmosphere, and the pressure of the air filling the space 32 may be regarded as a reference pressure. When the barometric pressure of the ambient atmosphere rises above the reference pressure, the diaphragm 23 moves inwardly and the dome-shaped element 25 connected thereto compresses the granules of the carbon pile 26 thereby decreasing the electrical resistance thereof; the annularly corrugated configuration of diaphragm 23 as shown in section in FIG. 3 and in plan view in FIG. 4 being particularly adapted to facilitate such action thereof. When the barometric pressure of the ambient atmosphere falls below the reference pressure, the diaphragm 23 moves outwardly together with the dome-shaped element 25 connected thereto permitting the carbon pile 26 to expand and thereby increase the electrical resistance thereof.

Turning now to FIG. 5 of the drawing, there is graphically depicted the relationship between the atmospheric pressure at the location of the telephone 11 hereinbefore set forth and the electrical resistance of the circuit including the same; such relationship being shown by the straight-line curve 34. In FIG. 5, the abscissas of points on the curve 34 indicate atmospheric pressures ranging from low ($A_L$) through normal, or standard sea-level pressure ($A_N$), to a high level of atmospheric pressure ($A_H$); and the ordinates thereof correspondingly indicate electrical resistances of the hereinbefore mentioned circuit ranging from high ($R_H$) through normal ($R_N$) to a low ($R_L$). The linearity of the curve 34 between the point indicating high electrical resistance at low atmospheric pressure, through the point indicating normal electrical resistance at normal, or standard sea-level atmospheric pressure, to the point indicating low electrical resistance at high atmospheric pressure, illustrates the direct responsiveness of changes in electrical resistance of the circuit including the telephone 11 to variations in the ambient atmospheric pressure.

A longitude and latitude grid covering an area of the midwestern United States typically provided with telephone service is depicted in FIG. 6 of the drawing. Near or on each intersection of the grid lines thereof, a group of telephones 11, designated by the reference numeral 35, is shown; each group of telephones 35 shown in FIG. 6 in actual practice being positioned much closer to the adjacent grid line intersection than as illustrated. Each group of telephones 35 includes enough telephones 11 having the transmitter component 18 according to the present invention to provide reasonable assurance that at least one of the telephones 11 in each group 35 of the same will be in use at the times when an indication of the ambient atmospheric pressure is desired. Inasmuch as the present telephone population of the United States is such that an average of thirty-six operative telephone instruments are installed within the vicinity of each longitude-latitude grid line intersection, taken at one nautical mile or one-minute intervals, no difficulty is anticipated in locating sufficient telephones in which to install the transmitter component according to the instant invention near each point where atmospheric pressure readings are desired; it being presently anticipated that so equipping not more than seven or eight of the average of 36 telephones located near each such reading point would be sufficient for this purpose. It will be noted that the grid lines shown in FIG. 6 are taken at one-degree intervals, and it is believed that in actual practice atmospheric pressure readings taken at such intervals would be quite useful for the purposes hereinbefore outlined. Further, at the present time, it is considered feasible to extend the system proposed herein to provide such atmospheric pressure readings at 15-minute rather than one-degree intervals, and it is believed that by 1980 the number of telephones in use in the United States will have increased to the point where such readings could be taken at 1-minute, or 1 nautical mile, intervals.

The transmitter components 18 for installation in the selected telephones 11 are constructed to have as nearly as possible the same basic electrical resistance, and are preferably assembled under controlled conditions in order to establish the reference pressure, i.e., the pressure of the air sealed within the space 32, of each transmitter component 18 at a uniform level, say standard sea-level pressure, or one atmosphere. As mentioned hereinbefore, atmospheric pressure readings are taken as nearly as simultaneously as possible at each of the points where a group of the telephones 35 is located by making use of one of the telephones 11 in use included within each group 35 thereof; utilization preferably being made of the telephone 11 in use nearest each of such points. Conventional equipment presently available and regularly in use at the central exchanges of telephone systems for determining which of the telephones incorporated in the systems are currently being used would readily permit the selection of telephones 11 having the standardized transmitter component 18 for this purpose. The conventional voltmeter 16, as hereinbefore set forth, could then be utilized to measure the electrical resistance of each circuit including a selected telephone 11. The total basic electrical resistance of the circuit including one telephone 11 providing an atmospheric pressure reading could differ from that including another telephone 11 used for this purpose, of course, according to distance from the central exchange of the telephone system and the consequent difference in length of the electrical leads 13 connecting one telephone 11 and the electrical leads 13 connecting the other telephone 11 to the switching equipment 14 located at the central exchange, and accounting for variations of this type would be necessary when the basic electrical resistances of the circuits including different telephones 11 are used for the purpose contemplated herein. When the voltmeter 16 is used to measure the electrical resistance of the circuit including a telephone 11 provided with the transmitter component 18 and currently in use, the indicator needle thereof may oscillate, inasmuch as the diaphragm element 23 of the transmitter component 18 acts to vary the electrical resistance of the carbon pile 26 thereof as a person speaks into the transmitter. However, any such oscillation of the indicator needle of the voltmeter 16 will be to either side of a point indicative of the atmospheric pressure established basic electrical resistance of the circuit including the telephone 11, which would be readily discernible by a person observing the voltmeter 16. The basic electrical resistance of the circuit including the telephone 11 so obtained, which could then be corrected by a factor taking into account the length of the electrical leads 13 thereof to obtain the basic electrical resistance of the carbon pile 26 of the transmitter component 18, provides a datum conventionally convertible into a barometric pressure reading of the ambient atmosphere at the location of the telephone 11.

While the hereinbefore outlined procedures for selecting a telephone having the transmitter component according to the instant invention currently in use near each of the points where a determination of atmospheric pressure is desired, and for then determining the basic electrical resistance of each circuit including such a telephone to provide data convertible to atmospheric pressure readings, is largely manual, it is presently anticipated that equipment may be provided to substantially completely eliminate such manual operations and to make such procedures completely automatic. The disclosure of such equipment, however, is considered to be beyond the scope of the present application.

Obviously, many modifications and variations of the present invention are possible in the light of the foregoing teachings. It is therefore to be understood that within the scope of the appended claims the invention may be practiced otherwise than as specifically described.

What is claimed as new and desired to be secured by Letters Patent of the United States is:

1. A telephone system including atmospheric pressure telemetering means, comprising:

at least one telephone provided with a transmitter component having a diaphragm peripherally hermetically sealed to a transmitter component casing element, said diaphragm having an outer surface operatively exposed to the ambient atmosphere and having an inner surface operatively exposed to a transmitter component internal space completely sealed off from the ambient atmosphere and filled with a gaseous medium at a predetermined reference pressure, said transmitter component including an electrically conductive pile composed of a mass of somewhat compressible granules, said diaphragm being provided with means for more heavily compressing said granules of said pile and thereby decreasing the electrical resistance thereof as a substantially central portion of said diaphragm moves inwardly when the ambient atmospheric pressure exceeds said reference pressure and for less heavily compressing said granules of said pile and thereby increasing the electrical resistance thereof as said substantially central portion of said diaphragm moves outwardly when said reference pressure exceeds the ambient atmospheric pressure;

circuit means electrically interconnecting said transmitter component electrically conductive pile and centrally located equipment of said telephone system; and means for measuring the electrical resistance of said circuit means including said transmitter component electrically conductive pile.

2. The system according to claim 1, wherein said transmitter component diaphragm is annularly corrugated between said substantially central portion thereof and a peripheral portion thereof for facilitating inward and outward movement of said substantially central portion thereof.

3. A telephone system including atmospheric pressure telemetering means, comprising:

at least one telephone provided with a transmitter component having a diaphragm peripherally hermetically sealed to a first electrically conductive casing element, said diaphragm having an outer surface operatively exposed to the ambient atmosphere and having an inner surface carrying on a central portion thereof an inwardly extending element, said transmitter component further having a second electrically conductive casing element as well as an electrically conductive pile composed of a mass of somewhat compressible granules in compressive contact with said inwardly extending element carried by said diaphragm and also in electrical contact with said first casing element and with said second casing element, said first casing element and said second casing element being electrically isolated each from the other except through said pile, said inner surface of said diaphragm surrounding said inwardly extending element carried thereon being exposed to a space completely sealed off from the ambient atmosphere and filled with a gaseous medium at a predetermined reference pressure, said central portion of said diaphragm being moveable inwardly when the ambient atmospheric pressure exceeds said reference pressure to permit said inwardly extending element carried by said inner surface thereof to more heavily compress said granules of said pile and thereby decrease the electrical resistance of said pile as well as further being moveable outwardly when said reference pressure exceeds the ambient atmospheric pressure to permit said inwardly extending element carried on said inner surface of said diaphragm to less heavily compress said granules of said pile and thereby increase the electrical resistance of said pile;

a first electrical lead electrically interconnecting said first casing element and switching equipment of said system and a second electrical lead electrically interconnecting said second casing element and said switching equipment; and means for measuring the electrical resistance of the circuit including said electrical leads and said telephone transmitter component.

4. The system according to claim 3, wherein said transmitter component diaphragm is annularly corrugated between said central portion thereof carrying said inwardly extending element and a peripheral portion thereof for facilitating inward and outward movement of said central portion thereof.

* * * * *